(12) United States Patent
Osaka et al.

(10) Patent No.: US 6,243,232 B1
(45) Date of Patent: Jun. 5, 2001

(54) MAGNETIC HEAD

(75) Inventors: Tomohiko Osaka; Norikazu Kudo, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/456,705

(22) Filed: Dec. 9, 1999

(51) Int. Cl.$^7$ .......................... G11B 21/21; G11B 17/32; G11B 5/60

(52) U.S. Cl. ..................... 360/234.2; 360/236.5; 360/236.8

(58) Field of Search ............................. 360/234.2, 236.1, 360/236.5, 236.8

(56) References Cited

U.S. PATENT DOCUMENTS

| | | | |
|---|---|---|---|
| 4,974,106 | * 11/1990 | White et al. | 360/102 |
| 5,128,821 | 7/1992 | Takeuchi et al. | 360/103 |
| 5,153,793 | 10/1992 | Takatori . | |
| 5,377,063 | 12/1994 | Taniguchi et al. | 360/103 |
| 5,636,085 | * 6/1997 | Jones et al. | 360/103 |
| 5,751,517 | * 5/1998 | Agarwal | 360/103 |
| 5,831,799 | * 11/1998 | Kudo et al. | 360/122 |
| 5,940,249 | * 8/1999 | Hendriks | 360/103 |
| 6,023,393 | * 2/2000 | White | 360/103 |

FOREIGN PATENT DOCUMENTS

| | | |
|---|---|---|
| 0237752 | 9/1987 | (EP) . |
| 0423661 | 4/1991 | (EP) . |
| 0466502 | 1/1992 | (EP) . |
| 0747890 | 6/1996 | (EP) . |
| 0935240 | 8/1999 | (EP) . |
| 63-224087 | * 9/1988 | (JP) . |
| 2-134718 | * 5/1990 | (JP) . |
| 04170711 | 6/1992 | (JP) . |
| 5-081810 | * 4/1993 | (JP) . |
| 06028804 | 2/1994 | (JP) . |
| 11-353773 | * 12/1999 | (JP) . |
| 11-353774 | * 12/1999 | (JP) . |
| 96/27873 | 9/1996 | (WO) . |

* cited by examiner

Primary Examiner—William Klimowicz
(74) Attorney, Agent, or Firm—Ladas & Parry

(57) ABSTRACT

A magnetic head has first and second magnetic head units for recording to and reproducing from first and second flexible rotating recording media; a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media; an elevating force control slot formed on at least the first air bearing surface so as to extend in a direction substantially perpendicular to the direction from which the first or second flexible rotating recording medium approaches the magnetic head; the first air bearing surface having a width dimension A1 located on a leading edge side of the magnetic head, and a width dimension A2 located on a trailing edge side, the width dimension A1 being larger than the width dimension A2; and an incision formed on the slider so as to penetrate in a direction of a height of the slider and determine the width dimension A2 of the trailing edge side of the first air bearing surface, the incision, elevating force control slot and central groove forming a single continuous structure, a leading edge of the incision positioned within a formation region of the elevating force control slot.

4 Claims, 6 Drawing Sheets

MAGNETIC HEAD

BACKGROUND OF THE INVENTION

1. Field of the Invention

The present invention relates generally to a magnetic head, and more particularly, to a magnetic head for recording and reproducing data in a state in which the magnetic head floats over a rotating recording medium, that is, a rotating magnetic disk, due to a change in air flow arising between the magnetic head and the magnetic disk.

2. Description of the Related Art

Generally, an ordinary magnetic disk drive that uses a flexible magnetic disk having a coercive force of 900 oersted (Oe) or less as a magnetic recording medium allows a relatively low rotational speed of for example 300 rpm. In this case, magnetic recording and reproduction is performed by causing the magnetic head to be in direct sliding contact with the magnetic disk.

However, with advances in recent years in high-density recording on magnetic disks, the rotation speed of the magnetic disk has been increased to for example 3000 rpm, with the coercive force of the magnetic disk being increased to 1500 Oe or more. As a result, in order to accommodate such so-called high-capacity magnetic disks a magnetic disk drive has appeared in which the magnetic head is provided with a narrow gap. Hereinafter such a magnetic disk drive will be referred to as a high-capacity magnetic disk drive.

Since a high-capacity magnetic disk drive allows the magnetic disk to be rotated at high speeds, the magnetic disk and the magnetic head used therein may be easily damaged if the magnetic head were to be caused to be in direct contact with the magnetic disk, as is done in the conventional magnetic disk drive.

As a result, the high-capacity magnetic disk drive is designed so that the magnetic head floats in an elevated state over the surface of the high-capacity magnetic disk due to an elevating force arising as a result of a change in an air flow caused by a relative speed between a slider surface of the magnetic head and the magnetic disk. Magnetic recording and reproduction is performed while a state of non-contact between the magnetic head and the magnetic disk is maintained.

FIGS. 1, 2, 3, 4 and 5 show a magnetic head used in the conventional high-capacity magnetic disk drive. As shown in FIGS. 1 and 2, the conventional high-capacity magnetic head 1 generally comprises a slider 2 and a magnetic head unit 3. The slider 2 supports the magnetic head unit 3 and causes the magnetic head unit 3 to float over the magnetic disk 6.

The top surface of the slider 2 forms an air bearing surface for forming an air bearing with respect to the magnetic disk 6. Additionally, a central groove 2a is formed at a central position of the top surface of the slider 2. As shown in FIG. 1, the central groove 2a divides the air bearing surface into a first air bearing surface 2b located to the right side of the central groove 2a and a second air bearing surface 5 located to the left side.

The magnetic head magnetic head unit 3 and a pair of grooves or slots 4 are provided at the first air bearing surface 2b. The magnetic head unit 3 for performing magnetic recording and reproducing is formed by sandwiching a gap member between thin plates of magnetic cores.

The slots 4 extend in a tangential direction of the magnetic disk 6, that is, in the direction of arrow X in FIG. 1, and provide a vent for an air flow produced between the magnetic disk 6 and the first air bearing surface 2b. By providing a vent to the air flow produced between the magnetic disk 6 and the first air bearing surface 2b, an elevating force exerted on the magnetic head 1 is reduced. Accordingly, by providing the slots 4, the elevating force of the magnetic head 1 can be controlled.

As described above, the second air bearing surface 5 is formed to the left of the central groove 2a located on the top surface of the slider 2 as shown in FIG. 2. Like the first air bearing surface 2b, the second air bearing surface 5 also produces a force for elevating the magnetic head 1.

FIG. 3 is a lateral cross-sectional view from a radial direction of disk approach. As shown in the drawing, a pair of magnetic heads are supported so as to be opposite each other within the magnetic disk drive. The elevating force generated by the second air bearing surface 5 described above exerts a force that pushes the magnetic disk 6 in the direction of the first air bearing surface 2b, that is, in the direction of the magnetic head unit 3, of the opposite magnetic head 1. Accordingly, the second air bearing surface 5 also functions as a pressure pad for pressing the magnetic disk 6 toward the opposite magnetic head 1.

Additionally, as described above slots 4 are formed in the first air bearing surface 2b. The slots 4 provide a vent for the air flow produced between the magnetic disk 6 and the fist air bearing surface 2b, thus reducing the elevating force exerted on the magnetic head 1. Accordingly, the magnetic disk 6 is deformed by a negative pressure generated in the slots 4 and a pressure generated at the second air bearing surface 5 due to a change in air flow so as to warp toward a gap 3a as the magnetic disk 6 rotates between the pair of magnetic heads 1. With this construction, optimum recording to and reproduction from the magnetic disk 6 is ensured even with floating magnetic heads 1.

A description will now be given of how the magnetic heads 1 face the magnetic disk 6, with reference to FIG. 4 and FIG. 5. FIGS. 4 and 5 show views of a state in which the magnetic head 1 is recording to or reproducing from a magnetic disk 6, from a radial Y direction of the magnetic disk 6.

FIG. 4 shows the magnetic disk 6 in a state of optimal approach to the magnetic head 1.

As shown in FIG. 4, a pair of slots 4 are formed in the first air bearing surface 2b in which the first magnetic head unit 3 is provided. These slots 4 are formed along an entire length of the first air bearing surface, that is, a direction indicated in the drawing by the double-headed arrow X, from a leading edge 7 of the magnetic head 1, that is, an edge side of the magnetic head 1 at which the magnetic disk 6 enters the magnetic head 1, to a trailing edge 8 of the magnetic head 1, that is, an edge side of the magnetic head 1 at which the magnetic disk 6 exits the magnetic head 1. As a result, a reduction in the elevating force due to the presence of the slots 4 is generated over the entire extent of the length of the first air bearing surface 2b.

Accordingly, even in a state of optimal approach a distance H between the magnetic disk 6 and the leading edge 7 of the magnetic head 1 in the above-described construction in which the slots 4 are provided is smaller than a corresponding distance in a construction in which the slots 4 are not provided.

Moreover, with such a construction the magnetic disk 6 is maintained in close proximity to the magnetic head unit 3 as a result of the reduction in elevating force by the slots 4, thus providing optimal magnetic recording and reproduction.

By contrast, FIG. 5 shows a state in which the magnetic disk 6 approaches the magnetic head 1 at a height position lower than that of an optimal approach. Such a small-clearance state of approach results from the flexibility of the magnetic disk 6 or from inevitable errors in the production process thereof.

When the height of the magnetic disk 6 upon approach to the magnetic head 1 is lower than a standard optimum height position as described above, the distance H is reduced to such an extent that the magnetic disk 6 may come into contact with the leading edge 7 of the magnetic head 1, and the magnetic disk 6 or the leading edge 7 of the magnetic head 1 may be damaged as a result.

At the same time, although the magnetic disk 6 is ordinarily enclosed in a hard case so as to prevent particles of dirt and dust from adhering to the surface of the magnetic disk 6, it is impossible to completely prevent the attachment of dust thereto, with the result that, inevitably, dust collects on the surface of the magnetic disk 6. If magnetic recording to and reproducing from a magnetic disk 6 to the surface of which dust has adhered is performed using a magnetic head 1, the dust may break loose from the surface of the magnetic disk 6 by the air flow generated at the first and second air bearing surfaces 2b, 5 and adhere to the magnetic heads 1.

As a result, because the width dimension of the slots 4 In the conventional magnetic head 1 is small the flow of air is restricted and thus dust accumulates in the slots 4. If this accumulated dust then breaks loose from the first and second air bearing surfaces 2b, 5, the magnetic disk 6, which is rotating at high speed, may be damaged by collision with the dust or the flow of air may be impaired by the dust, thus impairing proper magnetic recording and reproduction.

Further, the conventional magnetic head 1 has an overall box-like shape and a relatively heavy structure. As a result, the magnetic head 1 is unable to track the magnetic disk 6 if the magnetic disk 6 oscillates in a state in which the magnetic head 1 floats over the magnetic disk 6 to perform magnetic recording and reproduction. Thus, the magnetic head 1 and the disk 6 collide.

In other words, because the magnetic disk 6 is a flexible disk the magnetic disk 6 inevitably oscillates as the magnetic disk 6 rotates. At the same time, because the magnetic head 1 is heavy a large inertial force is exerted on the magnetic head 1. In the event that the magnetic disk 6 is displaced due to rotational oscillation, the large size of the inertial force prevents the magnetic head 1 from displacing instantaneously and thus the magnetic head 1 cannot follow the rotational oscillation of the magnetic disk 6. Accordingly, with the conventional magnetic head 1 it sometimes happened that the magnetic head 1 and the magnetic disk 6 collided when the magnetic disk 6 began to oscillate.

SUMMARY OF THE INVENTION

Accordingly, it is a general object of the present invention to provide an improved and useful magnetic head in which the disadvantages described above are eliminated. A more specific object of the present invention is to provide a magnetic head capable of reliably preventing contact between the slider and the recording medium while maintaining a state of optimum magnetic recording and reproduction by preventing the adherence of dust.

The above-described objects of the present invention are achieved by a magnetic head comprising:

a first magnetic head unit for recording to and reproducing from a first flexible rotating recording medium:

a second magnetic head unit for recording to and reproducing from a second flexible rotating recording medium having a coercive force lower than a coercive force of the first flexible rotating recording medium;

a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;

an elevating force control slot formed on at least the first air bearing surface so as to extend in a direction substantially perpendicular to the direction from which the first or second flexible rotating recording medium approaches the magnetic head;

the first air bearing surface having a width dimension A1 located on a leading edge side of the magnetic head and substantially perpendicular to a direction from which the first or second flexible rotating recording medium approaches the magnetic head, and a width dimension A2 located on a trailing edge side thereof and substantially perpendicular to said direction, the width dimension A1 being larger than the width dimension A2; and an incision formed on the slider so as to penetrate in a direction of a height of the slider and also determine the width dimension A2 of the trailing edge side of the first air bearing surface, the incision, elevating force control slot and central groove forming a single continuous structure, a leading edge of the incision positioned within a region of formation of the elevating force control slot.

According to the invention described above, by making the width dimension A1 larger than the width dimension A2, contact between the leading side edge of the slider and the magnetic disk can be prevented and, further, the first magnetic head unit and the recording medium can be brought into close proximity to each other.

Additionally, by forming the elevating force control slot on at least the first air bearing surface so as to extend in a direction substantially perpendicular to the direction from which the first or second flexible rotating recording medium approaches the magnetic head, the elevating force can be reduced because the air flow arising between the bearing surface and the recording medium can be vented via the elevating force control slot.

Additionally, by forming an incision on the slider so as to penetrate in a direction of a height of the slider and at the same time determine the width dimension A2 of the trailing edge side of the first air bearing surface the weight of the magnetic head can be reduced, making it possible to displace the magnetic head so as to follow the recording medium and to reduce the effect of rotational oscillation of the recording medium.

Additionally, by connecting the incision, the elevating force control slot and the central groove 18 as a single continuous structure and at the same time positioning an edge of the incision in the direction of travel of the recording medium within a region within which the elevating force control slot is formed, the air inside the elevating force control slot is sucked up by the fast-moving flow of air moving through the central groove and exhausted to the exterior of the magnetic head from the incision. As a result, even if dust which has adhered to the surface of the recording medium gets into the elevating force control slot such dust can be reliably removed from the elevating force control slot.

Further, the volume of air flow can be increased because air flows along a rear surface of the slider as well as the sides of the slider. Accordingly, reduction of the elevating force with respect to the recording medium and the exhaust of dust can be performed more effectively.

Moreover, by connecting the incision and the elevating force control slot as a continuous structure the flow of air inside the elevating force control slot can be made smooth and the adherence of dust to the magnetic head can be more effectively prevented.

Additionally, the above-described objects of the present invention are also achieved by magnetic head as described above, wherein the second air bearing surface has a width dimension A3 located on a leading edge side of the magnetic head and substantially perpendicular to a direction from which the first or second flexible rotating recording medium approaches the magnetic head, and a width dimension A4 located on a trailing edge side thereof and substantially perpendicular to said direction, the width dimension A3 being larger than the width dimension A4, the relation between the width dimensions A1, A2, A3 and A4 being such that A3>A1>A4>A2.

According to the invention described above, it is possible to achieve optimum positioning of the magnetic head when magnetically recording and reproducing.

That is, by ensuring that A3 is larger than A1 and A4 is larger than A2, the surface area of the first air bearing surface, which is the side that accommodates a magnetic disk having a high coercive force, is made smaller than the surface area of the second air bearing surface, which is the side that accommodates a magnetic disk having a low coercive force and thus the elevating force generated at the first air bearing surface is smaller than the elevating force generated at the second air bearing surface.

Additionally, by ensuring that A1 is larger than A2 and A3 is larger than A4, the elevating force generated at the trailing edge is smaller than the elevating force generated at the leading edge.

Accordingly, it is possible to bring the first magnetic head and the recording medium into close proximity to each other when magnetically recording to and reproducing from a magnetic disk having a high coercive force for optimal magnetic recording and reproduction. Additionally, a collision between the magnetic head and the recording medium upon approach of the recording medium to the magnetic head can be reliably prevented because the magnetic head and the recording medium are in a well-separated state at the leading edge of the magnetic head.

Additionally, the above-described objects of the present invention are also achieved by the magnetic head as described above, wherein the incision determines the width dimension A4 of the second air bearing surface.

According to the invention described above, by varying a width dimension A4 of the second air bearing surface using the incision, the incision can be made large and thus the weight of the magnetic head can be reduced. As a result, the ability of the magnetic head to track rotational oscillations of the recording medium can be further improved.

Other objects, features and advantages of the present invention will become more apparent from the following detailed description when read in conjunction with the accompanying drawings.

DESCRIPTION OF THE PREFERRED EMBODIMENTS

A description will now be given of an embodiment of the present invention with reference to the accompanying drawings.

Figure 1:
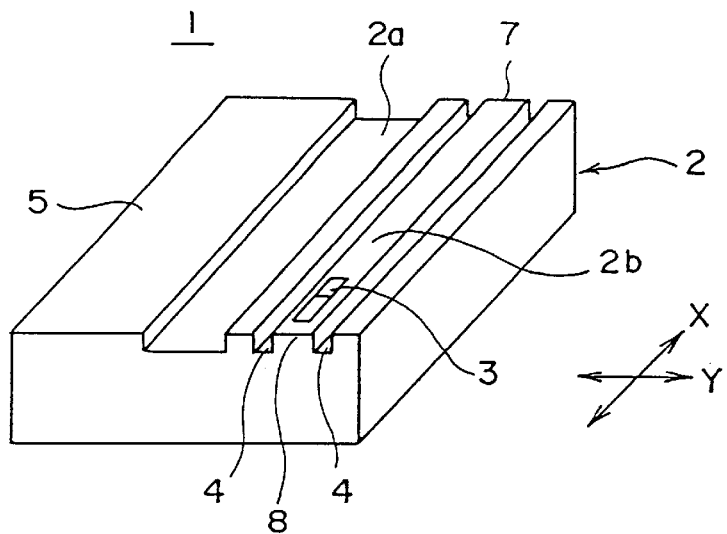
FIG. 1 is a perspective view of a conventional magnetic head for explaining the problems thereof.
Figure 2:
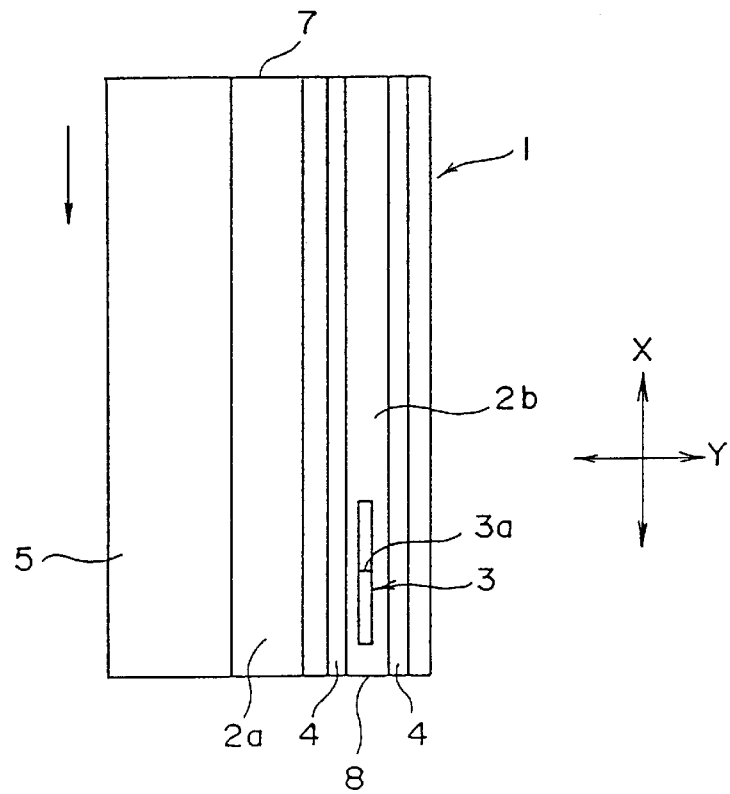
FIG. 2 is a plan view of the conventional magnetic head.
Figure 3:
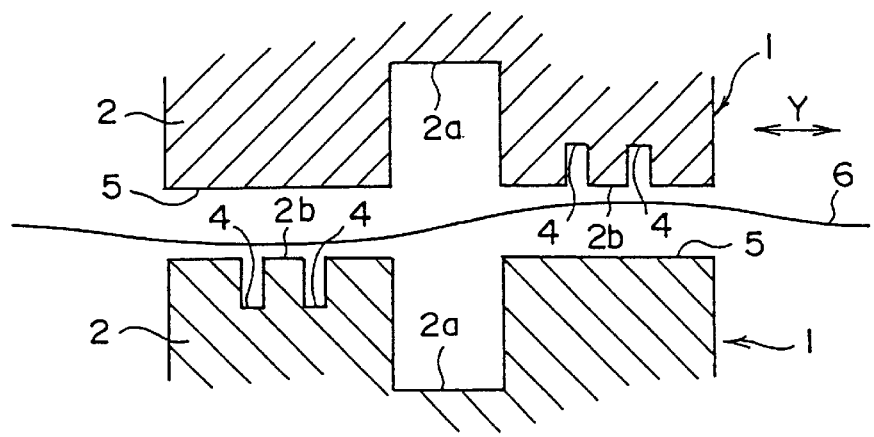
FIG. 3 is a lateral cross-sectional view of the conventional magnetic head from a direction of approach of a disk.
Figure 4:
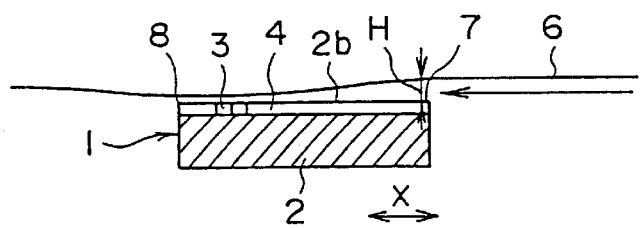
FIG. 4 is a lateral cross-sectional view of the conventional magnetic head from a radial Y direction of a disk for explaining a state of approach of the disk.
Figure 5:
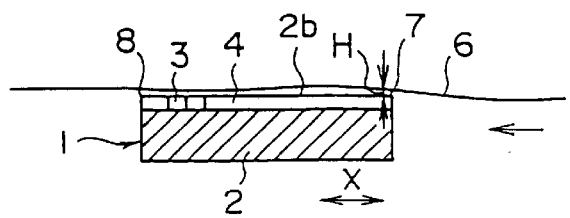
FIG. 5 is a lateral cross-sectional view of the conventional magnetic head for explaining a state in which a height of approach of a disk is lower than a standard optimum height.
Figure 6:
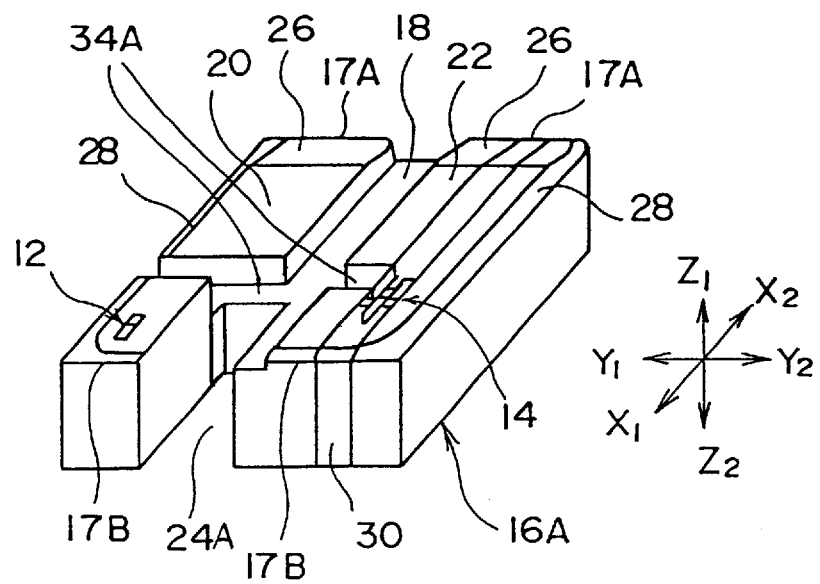
FIG. 6 is a perspective view of a first embodiment of a magnetic head according to the present invention.
Figure 7:
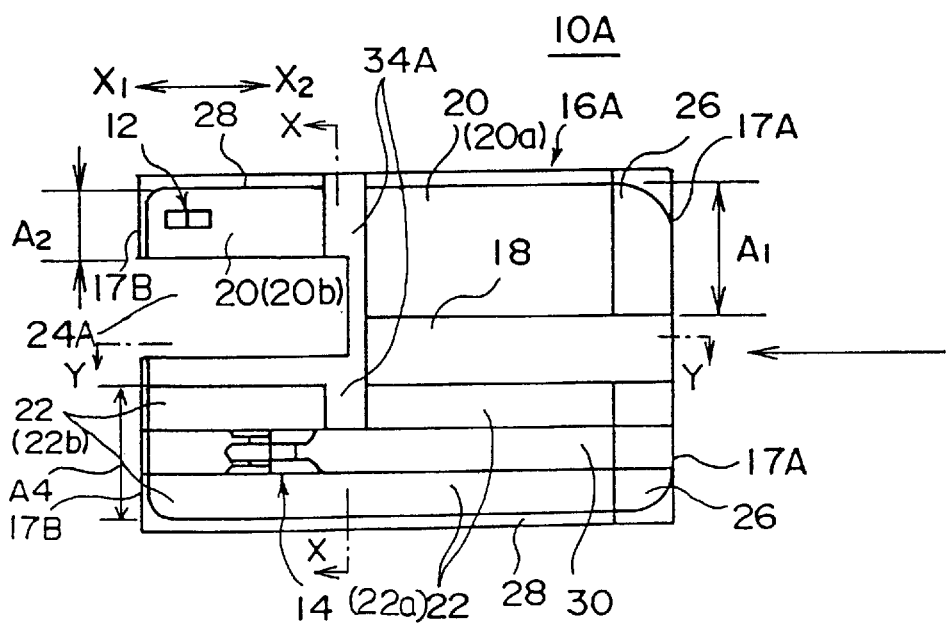
FIG. 7 is a plan view of a first embodiment of the magnetic head according to the present invention.
Figure 8:
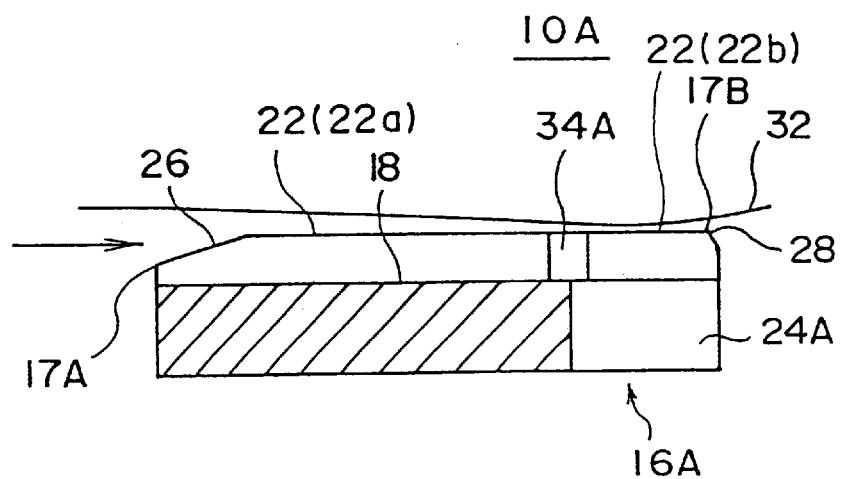
FIG. 8 is a cross-sectional view of the magnetic head shown in FIG. 7 along a line Y—Y therein.
Figure 9:
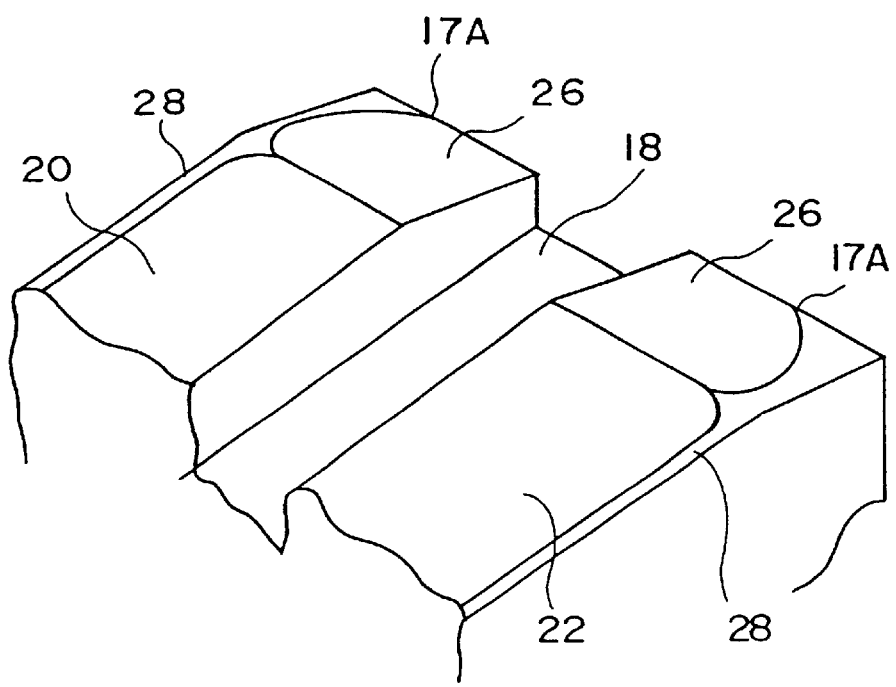
FIG. 9 is an enlarged view of the slanting surface provided on a first embodiment of the magnetic head according to the present invention.
Figure 10:
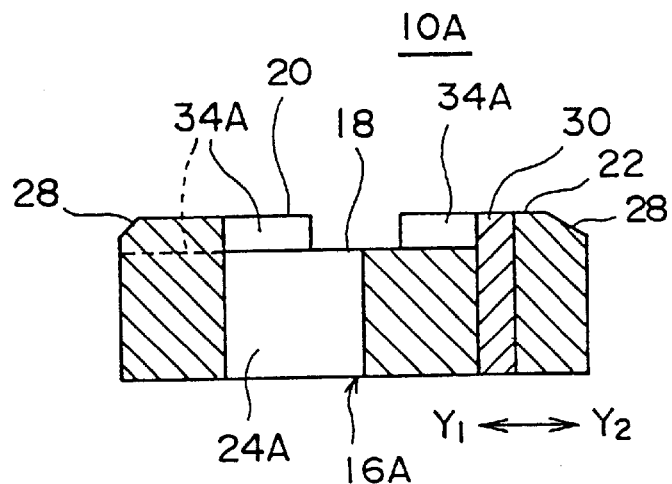
FIG. 10 is a cross-sectional view of the magnetic head shown in FIG. 7 along a line X—X therein.

FIGS. 6, 7, 8, 9 and 10 show a first embodiment of a magnetic head 10A according to the present invention. FIG. 6 is a perspective view of a first embodiment of a magnetic head 10A according to the present invention. FIG. 7 is a plan view of a first embodiment of the magnetic head 10A according to the present invention. FIG. 8 is a cross-sectional view of the magnetic head 10A shown in FIG. 7 along a line Y—Y therein. FIG. 9 is an enlarged view of the slanting surface provided on a first embodiment of the magnetic head 10A according to the present invention. FIG. 10 is a cross-sectional view of the magnetic head 10A shown in FIG. 7 along a line X—X therein.

The magnetic head 10A generally comprises a first magnetic head unit 12, a second magnetic head unit 14 and a slider 16A. The first and second magnetic head units 12, 14 are provided on air bearing surfaces 20, 22 formed on the slider 16A. Of the pair of magnetic head units 12, 14, the first magnetic head unit 12 is a high-capacity magnetic head for magnetic recording and reproduction, and is adapted for magnetic disks, or recording media, having a coercive force of 1500 Oe or more. The second magnetic head unit 14 is a magnetic head for ordinary magnetic recording and reproduction, and is adapted, for example, for magnetic disks having a coercive force of approximately 600–700 Oe. The second magnetic head unit 14 is constructed so that a read/write gap (R/W gap) and an erase gap (E gap) are formed by sandwiching a gap member between magnetic head cores 30. In other words, the magnetic head 10A according to this first embodiment of the present invention has a so-called compatible-type magnetic head structure, capable of performing both ordinary magnetic recording and reproduction as well as high-capacity magnetic recording and reproduction.

The slider 16A is a block member formed, for example, of a ceramic. The slider 16A supports the first and second magnetic head units 12, 14 and also provides a force for elevating the first and second magnetic head units 12, 14 so that the first and second magnetic head units 12, 14 float over a magnetic disk 32. Additionally, the slider 16A is provided with a central groove 18, a first air bearing surface 20, a second air bearing surface 22, an incision 24A, a slanting surface 26, a chamfered part 28 and an elevating force control slot 34A.

The central groove 18 is formed at a position in a center of a width of a top surface of the slider 16A, that is, in a direction indicated by arrows Y1–Y2 in the drawing, so as to extend longitudinally in a direction of travel of the magnetic disk 32, that is, in a direction indicated by the arrows X1–X2 in the drawing. By forming the central groove 18, the first and second air bearing surfaces are formed so as to sandwich the central groove of the slider 16A.

In order for the magnetic head 10A to float properly over the magnetic disk 32, the air flow generated between the slider 16A and the magnetic disk 32 must be smooth. It is for this purpose that the first and second air bearing surfaces 20, 22 are formed as highly flat surfaces.

Additionally, as shown in the enlarged view presented in FIG. 9, the slanting surface 26 extending across a predetermined range is formed on the leading edge of the slider 16A, that is, the X2 edge, from which the magnetic disk 32 approaches. This slanting surface 26 forms an angle of for example 60 minutes or less with respect to the first and second air bearing surfaces 20, 22. By forming the slanting surface 26 on the leading edge of the slider 16A facing the approaching magnetic disk 32, a hard collision between the magnetic disk 32 and the slider 16A can be prevented.

It should be noted that, in the following description, the X1 edge of the slider 16A facing the magnetic disk 32 as it withdraws is referred to as a trailing edge 17B. Additionally, the X2 edge of the slider 16A facing the magnetic disk 32 as it approaches is referred to as the leading edge 17A.

Additionally, a chamfered part 28 is formed on an outer periphery of the first and second air bearing surfaces 20, 22. Providing the chamfered part 28 also prevents the magnetic disk 32 from colliding hard against the slider 16A when the magnetic head 10A is in a floating state.

That is, the magnetic disk 32 is a flexible disk, so inevitably the magnetic disk 32 oscillates when it rotates and this oscillation causes the flow of air between the slider 16A and the magnetic disk 32 to change. Although the slider 16A, that is, the magnetic head 10A, displaces so as to track this change in air volume, when this change is large the slider 16A cannot displace so as to track same and thus there is a possibility that the slider 16A and the magnetic disk 32 will collide. At this time it is the periphery portion of the first and second air bearing surfaces 20, 22 that is the first to contact the magnetic disk 32.

Thus, by forming the chamfered part 28 on the periphery of the first and second air bearing surfaces 20, 22, that is, at a position at which the slider 16A and the magnetic disk 32 collide easily, the magnetic disk 32 is prevented from colliding hard against the slider 16A.

At the same time, the incision 24A is formed on the X1 side, that is, the trailing edge side, of the central groove 18 formed on the slider 16A. The incision 24A is configured so as to penetrate a thickness direction of the slider, that is, a direction indicated by arrows Z1–Z2 in the drawing.

The above-described magnetic head 10A floats over the magnetic disk 32 due to an elevating force generated by a change in air flow caused by a relative speed between the first and second air bearing surfaces 20, 22 of the slider 16A and the magnetic disk 32. As shown in FIG. 8, magnetic recording and reproduction is performed while a state of non-contact between the magnetic head and the magnetic disk 32 is maintained.

A description will now be given of the first air bearing surface 20 formed in the slider 16A of the magnetic head 10A.

As described above, according to the first embodiment the magnetic head 10A, by varying the width of the incision 24A in the Y1–Y2 direction, the widths A2 and A4 of the trailing edge 17B of the first and second air bearing surfaces 20, 22 can be controlled.

According to the first embodiment, the incision 24A is formed such that the width A2 of the trailing edge 17B of the first air bearing surface 20 is smaller than the width A1 of the leading edge 17A of the first air bearing surface 20 that is A1>A2. More specifically, the width A2 at the trailing edge 17B is set to be less than or equal to one-third the width A1 at the leading edge 17A, that is, A2 (2·A1/3).

By setting the width A1 at the leading edge 17A of the first air bearing surface 20 to be greater than the width A2 at the trailing edge 17B thereof, contact between the leading edge 17A and the magnetic disk 32 can be prevented and at the same time the magnetic disk 32 can be maintained in close proximity to the first magnetic head unit 12.

A description will now be given of the reason for the above-described advantages.

The elevating force generated between the first air bearing surface 20 and the magnetic disk 32 is related to the surface area of the first air bearing surface 20. That is, the elevating force is generated as a result of the air flow between two opposed parts, the first air bearing surface 20 and the magnetic disk 32. As a result, the larger the surface area of the first air bearing surface 20, the larger the elevating force.

Accordingly, by setting the width A2 of the trailing edge 17B of the first air bearing surface 20 to be smaller than the width A1 of the leading edge 17A thereof, the surface area of the trailing edge 17B of the first air bearing surface 20 is made smaller than the surface area of the leading edge 17A thereof. That is, the elevating force generated between the first air bearing surface 20 and the magnetic disk 32 is greater at the leading edge 17A of the first air bearing surface 20 and smaller at the trailing edge thereof.

Accordingly, as shown in FIG. 8, a state arises in which the magnetic disk 32 is distant from the first air bearing surface 20 at the leading edge 17A of the first air bearing surface 20 while the magnetic disk 32 is in close proximity to the first air bearing surface 20 at the trailing edge 17B thereof, that is, a position near the first and second magnetic head units 12, 14.

By thus keeping the magnetic disk 32 and the first air bearing surface 20 widely separated at the leading edge 17A, the leading edge 17A can be prevented from contacting the magnetic disk 32 even when the magnetic disk 32 approaches the magnetic head 10A at a smaller than optimal clearance, that is, lower than a standard optimum height position, and thus the magnetic disk 32 can be prevented from being damaged.

Additionally, it is possible to bring the magnetic disk 32 into close proximity to the first magnetic head unit 12 because the elevating force decreases at the trailing edge. By bringing the first magnetic head unit 12 and the magnetic disk 32 into close proximity to each other, it is possible to perform strong magnetic recording when recording and it is possible to obtain strong reproduction signals when reproducing.

At the same time, according to the magnetic head 10A of the present embodiment, an elevating force control slot 34A is formed on the first and second air bearing surfaces 20, 22 so as to extend in a direction perpendicular to the direction of travel of the magnetic disk 32, that is, in a Y1–Y2 direction.

By forming the elevating force control slot 34A the elevating force is reduced, because the flow of air between the air bearing surfaces 20, 22 and the magnetic disk 32 at a position at which the elevating force control slot 34A is formed is vented via the elevating force control slot 34A.

The elevating force control slot 34A has a bottom, and is formed so as to extend toward the first air bearing surface 20 from a side on which a magnetic head core 30 is located. Additionally, an edge portion of the incision 24A, and more specifically an edge portion of the incision 24A in the X2 direction, is positioned within a region of formation of the elevating force control slot 34A.

By forming the elevating force control slot 34A, the first air bearing surface 20 is divided into a first leading edge bearing surface 20a and a first trailing edge bearing surface 20b, hereinafter referred to as first leading surface 20a and first trailing surface 20b, respectively.

Similarly, by forming the elevating force control slot 34A, the second air bearing surface 22 is divided into a second leading edge bearing surface 22a and a second trailing edge bearing surface 22b, hereinafter referred to as second leading surface 22a and second trailing surface 22b, respectively.

By providing the above-described elevating force control slot 34A the elevating force is reduced, because the flow of air between the air bearing surfaces 20, 22 and the magnetic disk 32 at a position at which the elevating force control slot 34A is formed is vented via the elevating force control slot 34A.

In particular, according to this first embodiment of a magnetic head 10A according to the present invention, a passageway for venting the flow of air is formed on a rear surface of the slider 16A from the elevating force control slot 34A via the incision 24A because the edge of the incision 24A is positioned within the region of formation of the elevating force control slot 34A. As a result, the elevating force is reduced at and near the position of formation of the incision 24A and the elevating force control slot 34A on both the first and second air bearing surfaces 20, 22. Accordingly, the magnetic disk 32 and the first magnetic head unit 12 can reliably be brought into close proximity to each other to enable optimum magnetic recording and reproduction.

However, as previously noted, although the magnetic disk 32 is enclosed in a hard case so as to prevent particles of dirt and dust from adhering to the surface of the magnetic disk 32, it is impossible to completely prevent the attachment of dust thereto, with the result that, inevitably, dust collects on the surface of the magnetic disk 32. Additionally, if the magnetic disk 32 is used for an extended period of time, magnetic particles may break loose from the magnetic disk 32. Hereinafter, such magnetic particles and other particles of dirt and dust are referred to as simply dust. If this dust adheres to and accumulates at and breaks loose from a surface of the slider 16A that is opposite the magnetic disk 32, then, as noted previously, the magnetic disk 32 may be damaged and it may become impossible to perform optimum magnetic recording and reproduction.

However, by positioning the edge of the incision 24A within the region of formation of the elevating force control slot 34A, the magnetic head 10A according to the present invention is configured so that the incision 24A and the elevating force control slot 34A form a continuous structure. Additionally, the central groove 18 is also connected to the incision 24A and the elevating force control slot 34A. Further, the incision 24A is formed on the slider 16A so as to penetrate in a direction of a height of the slider 16A, thus reducing passageway resistance.

As a result, during magnetic recording and reproduction the flow of air through the central groove 18 and the elevating force control slot 34A is directed toward the incision 24A and exhausted to the rear surface of the slider 16A. At this time, the speed of the flow of air flowing through the central groove 18 is faster than the speed of the flow of air flowing through the elevating force control slot 34A because the central groove 18 is a slot that extends in a direction of rotation of the magnetic disk 32. Accordingly, because the incision 24A, the elevating force control slot 34A and the central groove 18 are all interconnected, the air inside the elevating force control slot 34A is sucked up by the fast-moving flow of air moving through the central groove 18 and thereafter progressively exhausted to the rear surface of the slider 16A from the incision 24A. As a result, even if dust that has adhered to the surface of the magnetic disk 32 gets into the elevating force control slot 34A, which is narrow compared to the central groove, such dust can be reliably removed from the elevating force control slot 34A. Thus, dust does not adhere to and accumulate on the magnetic head 10A, and damage to the magnetic disk 32 caused by dust can be reliably prevented.

Further, as described above, the incision formed in the first embodiment of the magnetic head 10A according to the present invention is formed on the slider 16A so as to penetrate in a direction of a height of the slider 16A, so the magnetic head 10A of the present invention can be made lighter than the conventional magnetic head 1.

However, as described above, the magnetic disk 32 is a flexible disk, so inevitably the magnetic disk 32 oscillates as it rotates. Moreover, if the magnetic head is heavy like the conventional magnetic head 1, then when the magnetic head 1 attempts to displace, a large inertial force is exerted in a direction opposing the attempted displacement. As a result, when rotational oscillations of the magnetic disk 32 occur, this inertial force causes the magnetic head 1 to be unable to displace instantaneously and, as described above, the magnetic head 1 and the magnetic disk 32 might collide.

However, by forming the incision 24A on the slider 16A so as to penetrate in a direction of a height of the slider 16A the weight of the magnetic head 10A is reduced, and accordingly the inertial force exerted on the magnetic head 10A is reduced as well. Therefore even if the magnetic disk 32 is displaced due to rotational oscillation the magnetic head 10A can displace so as to follow such displacement of the magnetic disk 32. As a result, collision of the magnetic head 10A and the magnetic disk 32 can be reliably prevented.

Next, a description will be given of a second embodiment of a magnetic head 10B according to the present invention, with reference to FIGS. 11, 12 and 13.

Figure 11:
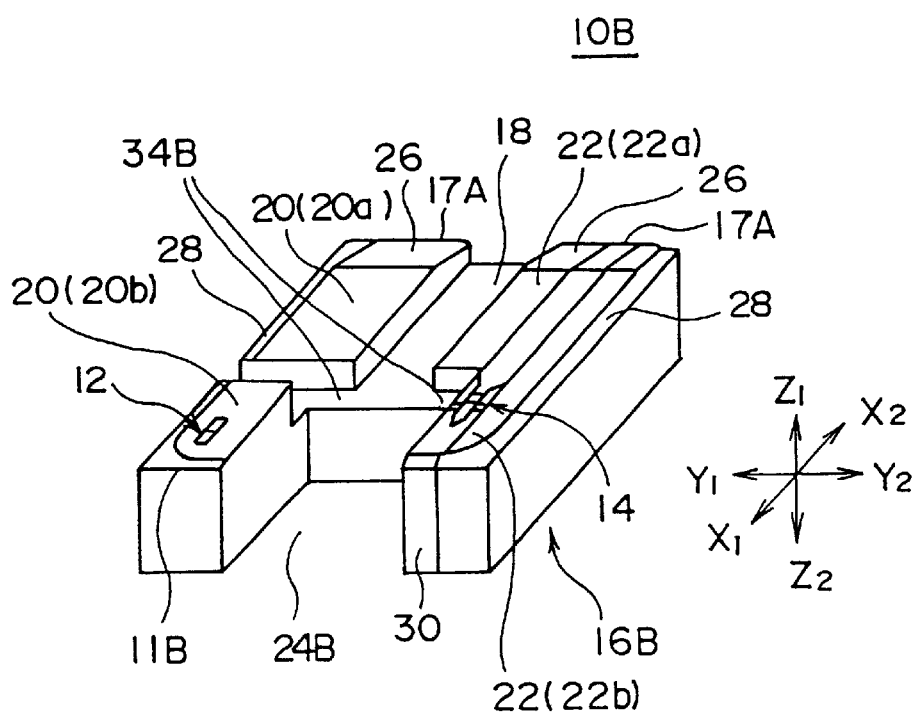
FIG. 11 is a perspective view of a second embodiment of a magnetic head according to the present invention.
Figure 12:
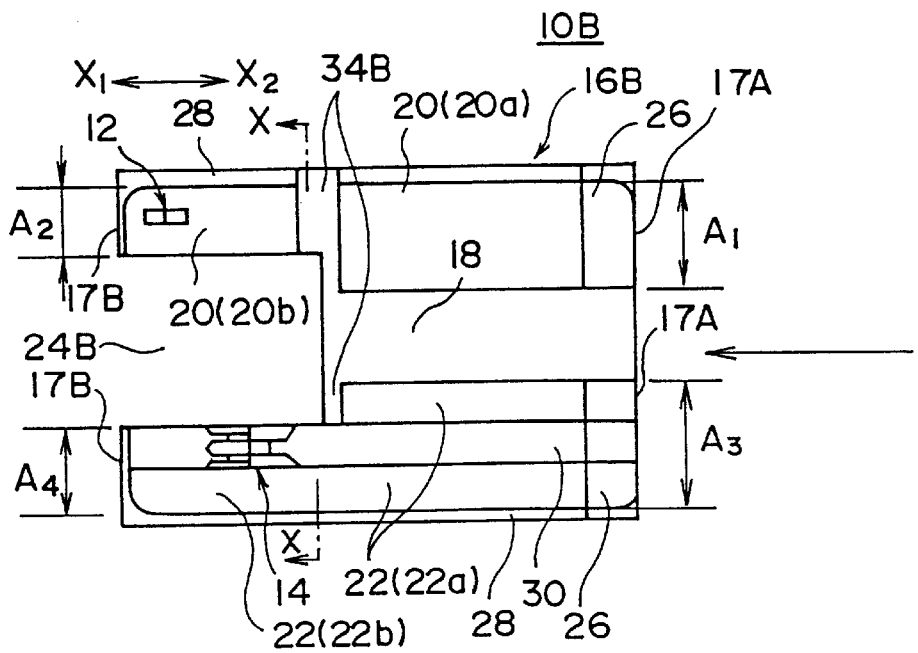
FIG. 12 is a plan view of a second embodiment of the magnetic head according to the present invention.
Figure 13:
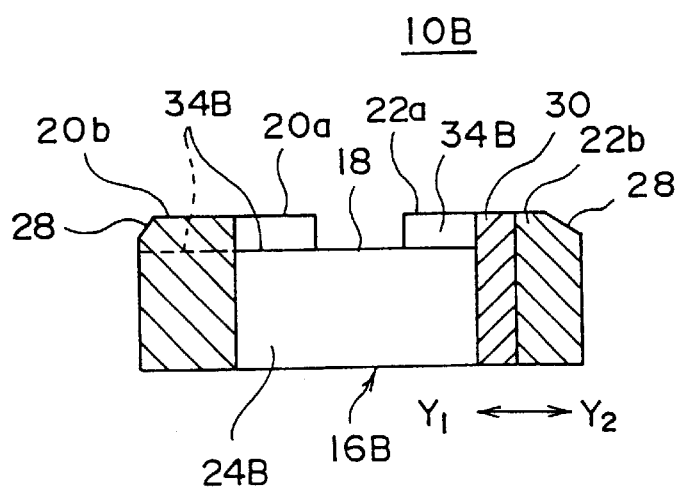
FIG. 13 is a cross-sectional view of the magnetic head shown in FIG. 12 along a line Y—Y therein.

FIG. 11 is a perspective view of a second embodiment of a magnetic head according to the present invention, FIG. 12 is a plan view of a second embodiment of the magnetic head according to the present invention and FIG. 13 is a cross-sectional view of the magnetic head shown in FIG. 12 along a line Y—Y therein.

It should be noted that, in FIGS. 11, 12 and 13, those parts identical to the corresponding parts of the magnetic head 10A of the first embodiment shown in FIGS. 6, 7, 8, 9 and 10 are given identical reference numerals and a description thereof is omitted.

In the first embodiment by forming an incision 24A in the slider 16A, the width A1 of the leading surface 20a of the first air bearing surface 20 is made larger than the width A2 of the trailing surface 20b of the first air bearing surface 20, that is, A1>A2.

By contrast, the second embodiment of a magnetic head 10B according to the present invention restricts the dimensions of the second air bearing surface 22 in addition to the first air bearing surface 20 while still satisfying the above-described conditions.

More specifically, a width dimension A3 of a second leading edge 22a of a second air bearing surface 22 and a width dimension A4 of a second trailing surface 22b of the second air bearing surface 22 are made to be such that $$A3>A1>A4>A2 \tag{1}$$

It should be noted that an elevating force control slot 34B is provided in the second embodiment of a magnetic head 10B according to the present invention as well, with an edge portion of an incision 24B, that is, an edge portion of an incision 24B in an X2 direction, positioned within a region of formation of the elevating force control slot 34B.

By configuring the magnetic head 10B so as to satisfy equation (1) described above, it is possible to achieve optimum positioning of the magnetic head 10B when magnetically recording and reproducing.

A description will now be given of the reason for the above-described advantage.

By satisfying the above-described equation (1), A3 is made greater than A1 and A4 is made greater than A2. As a result, the surface area of the first air bearing surface 20, which is the side that accommodates a magnetic disk having a high coercive force, is made smaller than the surface area of the second air bearing surface 22, which is the side that accommodates a magnetic disk having a low coercive force. Accordingly, the elevating force generated at the first air bearing surface 20 is smaller than the elevating force generated at the second air bearing surface 22.

In other words, by satisfying the above-described equation (1), the elevating force at the location of the first magnetic head unit 12 to which one wants to bring the magnetic disk 32 into closest proximity is minimized when performing magnetic recording and reproduction, that is, when magnetically recording to and reproducing from a magnetic disk 32 having a high coercive force, thus making it possible to perform optimum magnetic recording and reproduction.

Additionally, it is possible to reliably prevent a collision between the magnetic head 10B and the magnetic disk 32 because the magnetic head 10B and the magnetic disk 32 are in a well-separated state at the leading edge side of the magnetic head 10B.

According to the inventions as described above, by positioning the edge portion of the incision 24A (24B) within a region of formation of the elevating force control slot 34A (34B) the elevating force of the air flow between the air bearing surface 20 and the recording medium 32 is reduced because the air is vented to the rear of the slider 16B via the elevating force control slot 34A (34B).

Additionally, by positioning an edge of the incision 24A (24B) in the direction of travel of the recording medium 32 within the region of formation of the elevating force control slot 34A (34B) as well as interconnecting the incision 24A (24B), the elevating force control slot 34A (34B) and the central groove 18 so as to form a continuous structure, the air inside the elevating force control slot 34A (34B) is sucked up by the fast-moving flow of air inside the central groove 18 and is exhausted to the exterior of the magnetic head 10A (10B) from the incision 24A (24B). As a result, even if dust which had adhered to the recording medium 32 gets into the elevating force control slot 34A (34B), such dust can be reliably removed from the elevating force control slot 34A (34B).

Additionally, it is possible to reliably prevent a collision between the magnetic head 10B and the magnetic disk 32 upon approach of the magnetic disk 32 to the magnetic head 10A (10B) because the magnetic head 10A (10B) and the magnetic disk 32 are in a separated state at the leading edge side of the magnetic head 10A (10B).

Moreover, by varying a width dimension A4 of the second air bearing surface 22 using the incision 24A (24B), the incision 24A (24B) can be made large and thus the weight of the magnetic head 10A (10B) can be reduced. As a result, the ability of the magnetic head 10A (10B) to track rotational oscillations of the recording medium 32 can be further improved.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope of the present invention.

What is claimed is:

1. A magnetic head comprising:
    a first magnetic head unit for recording to and reproducing from a first flexible rotating recording medium;
    a second magnetic head unit for recording to and reproducing from a second flexible rotating recording medium having a coercive force lower than a coercive force of the first flexible rotating recording medium;
    a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;
    an elevating force control slot formed on at least the first air bearing surface so as to extend in a direction substantially perpendicular to the direction from which the first or second flexible rotating recording medium approaches the magnetic head;
    the first air bearing surface having a width dimension A1 located on a leading edge side of the magnetic head and substantially perpendicular to a direction from which the first or second flexible rotating recording medium approaches the magnetic head, and a width dimension A2 located on a trailing edge side thereof and substantially perpendicular to said direction, the width dimension A1 being larger than the width dimension A2; and
    an incision formed on the slider so as to penetrate in a direction of a height of the slider and also determine the width dimension A2 of the trailing edge side of the first air bearing surface,
    the incision, elevating force control slot and central groove forming a single continuous structure, a leading edge of the incision positioned within a region of formation of the elevating force control slot.

2. The magnetic head as claimed in claim 1, wherein the second air bearing surface has a width dimension A3 located on a leading edge side of the magnetic head and substantially perpendicular to a direction from which the first or second flexible rotating recording medium approaches the magnetic head, and a width dimension A4 located on a trailing edge side thereof and substantially perpendicular to said direction, the width dimension A3 being larger than the width dimension A4, the relation between the width dimensions A1, A2, A3 and A4 being such that A3>A1>A4>A2.

3. The magnetic head as claimed in claim 2, wherein the incision determines the width dimension A4 of the second air bearing surface.

4. The magnetic head as claimed in claim 1, wherein the incision determines a width dimension A4 of the second air bearing surface.

\* \* \* \* \*